United States Patent
Chirilov et al.

(10) Patent No.: US 8,621,340 B2
(45) Date of Patent: Dec. 31, 2013

(54) BLOCK PROPERTIES AND CALCULATED COLUMNS IN A SPREADSHEET APPLICATION

(75) Inventors: Joseph M. Chirilov, Kirkland, WA (US); Dennis R. Newland, Monroe, WA (US); Eoin J. Burke, Seattle, WA (US); Hannah W. Zhou, Redmond, WA (US); John C. Haymond, Duvall, WA (US); Juha P. Niemisto, Mercer Island, WA (US); Robert C. Collie, Kirkland, WA (US); Robert W. Coffen, Redmond, WA (US); Thao Moua, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/018,418

(22) Filed: Dec. 20, 2004

(65) Prior Publication Data

US 2006/0136808 A1    Jun. 22, 2006

(51) Int. Cl.
*G06F 17/16* (2006.01)
*G06F 17/30* (2006.01)

(52) U.S. Cl.
USPC ............ 715/212; 715/217; 715/219; 715/249

(58) Field of Classification Search
USPC ......... 715/504, 513, 503, 509, 510, 212, 217, 715/219, 249; 707/1
See application file for complete search history.

(56) References Cited

U.S. PATENT DOCUMENTS

| | | | |
|---|---|---|---|
| 5,819,293 A * | 10/1998 | Comer et al. | 707/203 |
| 6,167,523 A | 12/2000 | Strong | 726/21 |
| 6,625,499 B2 * | 9/2003 | Abdalla | 700/25 |
| 6,640,234 B1 * | 10/2003 | Coffen et al. | 715/538 |
| 6,912,690 B2 * | 6/2005 | Bauchot | 715/504 |
| 6,988,241 B1 * | 1/2006 | Guttman et al. | 715/503 |
| 7,127,672 B1 | 10/2006 | Patterson et al. | 715/503 |
| 2001/0007988 A1 | 7/2001 | Bauchot et al. | 707/100 |
| 2002/0055954 A1 | 5/2002 | Breuer | 707/507 |
| 2002/0103825 A1 | 8/2002 | Bauchot | 707/504 |
| 2002/0161799 A1 * | 10/2002 | Maguire et al. | 707/503 |
| 2002/0169799 A1 | 11/2002 | Voshell | 707/503 |

OTHER PUBLICATIONS

Bott et al, "Special Edition Using Microsoft Office 2003", published: Sep. 15, 2003, publisher: Que, pp. 1-4.*

Stinson et al, "Microsoft Office Excel 2003", Published: Sep. 3, 2003, pp. 1-3.*

(Continued)

*Primary Examiner* — Stephen Hong
*Assistant Examiner* — Wilson Tsui
(74) *Attorney, Agent, or Firm* — Merchant & Gould

(57) ABSTRACT

Block properties and improved calculated columns properties are provided in a spreadsheet application. Once block properties are set for a group of spreadsheet cells or a spreadsheet list, the properties may be applied to the entire group of selected cells or list as opposed to requiring application of properties to individual cells. If rows or columns are added to the group of selected cells or list, properties applied to the group of cells or list are automatically applied to the new rows or columns. Block properties also provide for intelligent-behaving list borders where list borders are not corrupted by the movement or changing of columns or rows sharing edges with a list border. Calculated columns are a type of block property that extends the functionality of formulas throughout an entire column of an associated group of cells or list.

18 Claims, 2 Drawing Sheets

(56) References Cited

OTHER PUBLICATIONS

Stinson et al, "Microsoft Office Excel 2003", published: Sep. 3, 2003, pp. B1-B7.*

Stinson et al, "Microsoft Office Excel 2003", published: Sep. 3, 2003, p. 94.*

U.S. Office Action dated Nov. 29, 2005 cited in U.S. Appl. No. 10/646,131.

* cited by examiner

BLOCK PROPERTIES AND CALCULATED COLUMNS IN A SPREADSHEET APPLICATION

FIELD OF THE INVENTION

The present invention generally relates to spreadsheet applications. More particularly, the present invention relates to block properties and calculated columns in a spreadsheet application.

BACKGROUND OF THE INVENTION

Electronic spreadsheets organize information into a matrix of columns and rows. Each column within a row is referred to as a cell. Each cell of an electronic spreadsheet may store a data element, such as text or numerical data, or a formula that uses data elements from other cells to calculate a desired result. Various data elements in multiple cells may be combined to create lists (also known as "tables"). For example, a list may be created to track the performance of salespersons for a national software company. Such a list may include a header row including field names such as the name of each salesperson, the geographic region assigned to each salesperson, and the amount of sales generated by each salesperson. The list may also include a data region comprised of one or more data rows following the header row for displaying data associated with each field name. Field names in a header row may be manually formatted by a user to set them apart from associated data rows. The list may further include a formula for calculating a combined sales total for all salespersons in the company. If desired, the list may include a total row beneath the data rows for displaying aggregated data from the rows above the table row.

According to prior spreadsheet applications, user actions are affected at the cell level. For example, selecting a range of five cells and applying a formatting property, for example, bold formatting, applies the property to each individual cell. Each cell has the bold formatting property and no cell has knowledge of its neighboring cell's formats. If a new column or row is added increasing the range of five cells, the bold formatting must be manually applied to new cells added to the range. According to prior spreadsheet applications, if a user desires to utilize a formula in each cell of a list column, the user must copy the formula to each cell of the column. If the column is expanded by the addition of rows, the formula must be manually copied to each new cell in the column. In addition, according to prior spreadsheet applications, cell borders often track with cells in unexpected ways. For example, if a user defines a thick colored border around the perimeter of a spreadsheet list, the user typically desires that the border "stick" with the perimeter of the list even if she moves columns or rows within the list. Unfortunately, according to prior spreadsheet applications, if the user moves a row or column that shares an edge with the border, the border will attempt to stay with the moving row or column, and thus, the border becomes distorted.

It is with respect to these and other considerations that the present invention has been made.

SUMMARY OF THE INVENTION

Embodiments of the present invention solve the above and other problems by providing block properties and improved calculated columns in a spreadsheet application. According to one embodiment, block properties in a spreadsheet application are provided. Block properties is a spreadsheet application architecture that allows spreadsheet properties, such as formatting, conditional formatting, data validation, and the like, to be expressed at a level of abstraction higher than the spreadsheet cells. Once block properties are set for a group of spreadsheet cells or a spreadsheet list (also known as a "table"), the properties may be applied to the entire group of selected cells or list as opposed to requiring application of properties to individual cells. Once block properties are applied to a given group of cells or spreadsheet list, the properties grow with the size of the group of cells or list. That is, as columns or rows are added or removed to the group of cells or spreadsheet list, the block properties applied to the group of cells or list are automatically applied to the cells created by the added rows or columns. Block properties also provide for intelligent-behaving list borders where list borders are not corrupted by the movement or changing of columns or rows sharing edges with a list border. In addition, block properties also allows for intelligent formatting, for example formatting every alternate row with a different shading, and preserving that shading pattern no matter how many rows are added or removed, or if the list is filtered or sorted.

According to another embodiment, improved calculated columns are provided. Calculated columns are a type of block property that extends the functionality of formulas throughout an entire column of an associated group of cells or list. According to the improved calculated columns, a formula may be applied to one cell in a list column, and the entire list column will automatically be filled with the formula. As the list column grows, the applied formula will fill the growing column. Edits to the formula are automatically propagated to the whole column. Alternatively, if a user decides to modify the formula applied to a single cell in the column, the modification may be done, and the cell will be flagged to alert the user that the flagged cell formula is different from the formula propagated to all other cells in the column. Selection of the flag may provide an option to reset the formula to the original formula propagated through the cells of the column, or selection of the flag may provide the option of allowing the user to propagate the modified formula throughout all cells of the column.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to block properties for application to a block or group of spreadsheet cells or to a spreadsheet list. Embodiments of the present invention are also directed to improved calculated columns for propagation of a given cell formula to all cells contained in an associated list column. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
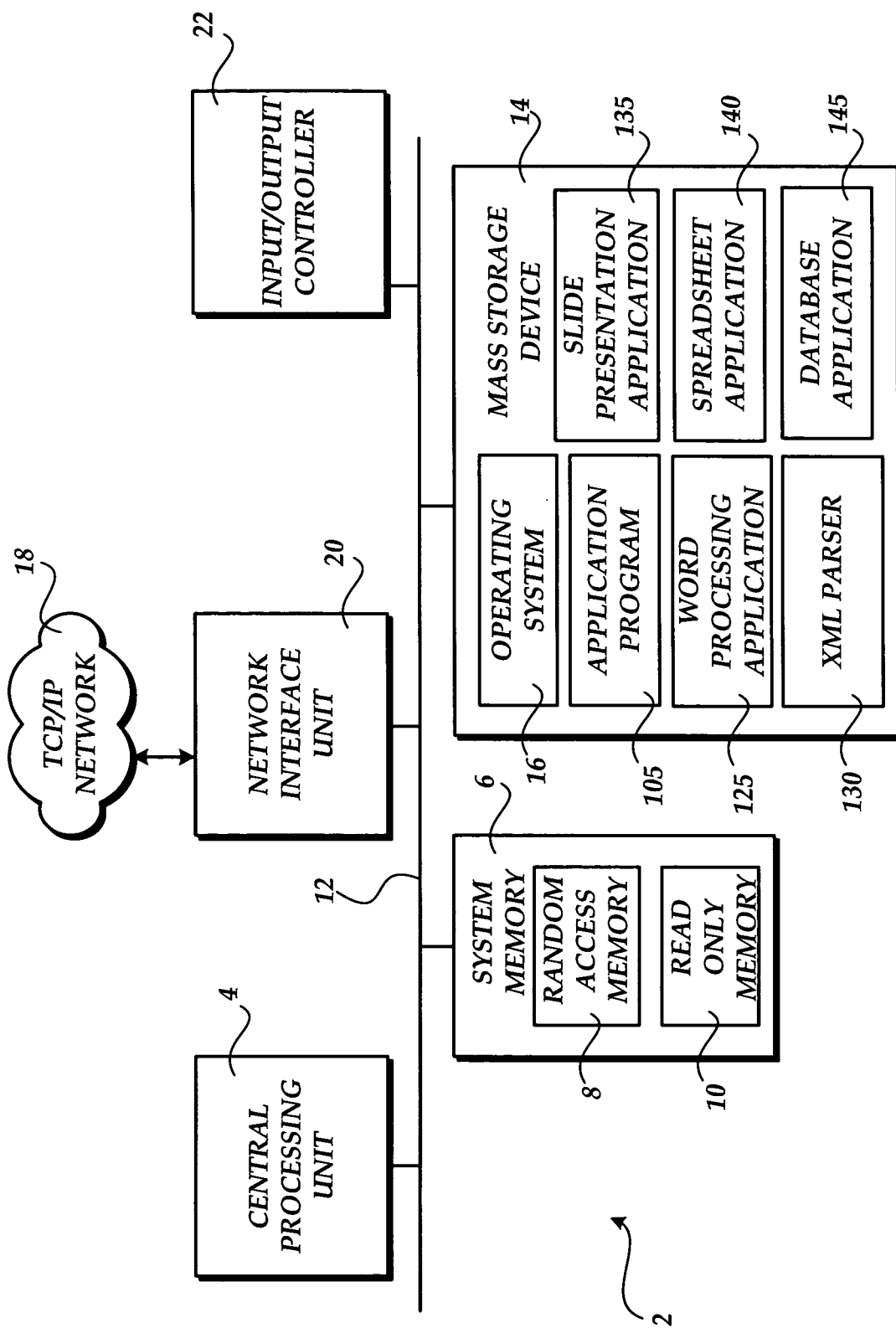
FIG. 1 illustrates a simplified block diagram of a computer system that provides an operating environment for the illustrative embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application suite for providing functionality from a number of different software applications. Some of the individual program modules that may comprise the multiple functionality application suite 105 include a word processing application 125, a slide presentation application 135, a spreadsheet application 140 and a database application 145. An example of such a multiple functionality application suite 105 is OFFICE manufactured by Microsoft Corporation. Other software applications illustrated in FIG. 1 include an Extensible Markup Language (XML) parser 130.

Figure 2:
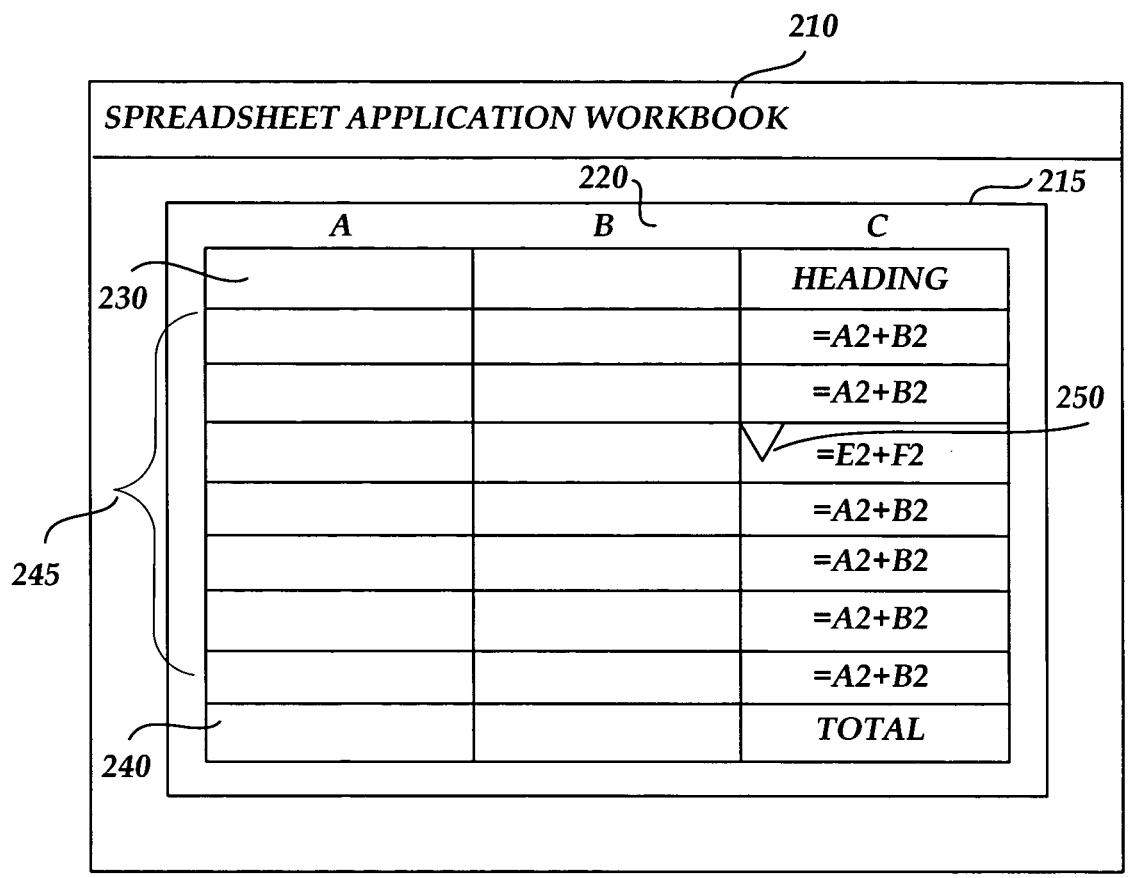
FIG. 2 is a simplified diagram of a spreadsheet application workbook showing a spreadsheet list according to embodiments of the present invention.

FIG. 2 is a simplified diagram of a spreadsheet application workbook showing a spreadsheet list according to embodiments of the present invention. According to embodiments of the present invention, the spreadsheet application workbook 210 is illustrative of a spreadsheet application worksheet for allowing the organization, calculation, display, and formatting of user text and data. An example spreadsheet application 140 for providing the spreadsheet application workbook 210 is EXCEL, manufactured by Microsoft Corporation, of Redmond, Wash.

The example spreadsheet application workbook 210 includes a spreadsheet list 215 (also known as a spreadsheet "table") comprised of three (3) columns A, B, C, and comprising nine (9) horizontal rows. The example spreadsheet list 215 includes a user-defined border 220 around the perimeter of the columns and rows of the spreadsheet list. A first row 230 is provided as a header row for the list 215, a last row 240 is provided as a total row for the list 215, and seven (7) rows are provided between the first and last rows for providing a data region in which user data and formulas may be populated. As is understood by those skilled in the art, the header row 230 typically provides a field for inserting a formatted user-defined title for the associated data. The total row 240 provides a field for displaying totals of data calculated in the data region made up of the seven (7) rows between the first and last rows of the list 215. The example list 215 is comprised of a block of cells defined by a user of the spreadsheet application workbook 210. That is, the list 215 may be expanded to include additional columns or additional rows as required by user needs.

According to the spreadsheet application 140 operating the spreadsheet application workbook 210, a variety of formatting properties and calculation formulas may be applied to individual cells of the spreadsheet application workbook. For example, a user may decide to shade a given cell in the spreadsheet application workbook with a desired color, text font, text style, and the like. According to embodiments of the present invention, block properties is a spreadsheet application architecture that allows properties, such as formatting, conditional formatting, data validation, and the like, to be applied to a selected group or block of spreadsheet cells, such as the block of cells associated with the spreadsheet list 215. That is, if it is desired to apply a particular formatting property, such as a background color, text size, text font, and the like, to a block of cells, such as the block of cells comprising the list 215, the block properties function allows the application of a desired property to all cells comprising a selected block of cells. According to one embodiment, block properties also allows for intelligent formatting, for example, formatting every alternate row with a different shading, and preserving that shading pattern no matter how many rows are added or removed, or if the list is filtered or sorted.

In order to apply a given property to an entire block of cells, such as the cells comprising the list 215, the desired block of cells is selected for editing. For example, a mouse cursor is clicked and moved over the desired block of cells to highlight the desired block of cells. Or, in the case of a list 215, selection of the list 215 may provide for selection of all cells contained in the list 215. Alternatively, block properties may be set to a list or table 215 by applying a pre-defined formatting attribute, such as a style setting, to a selected list or table 215. Once all desired cells are selected for editing, the desired property is applied to the selected block of cells or list 215. For example, a background shading color, a text font, a text size, a conditional formatting property, a data validation, and the like, may be applied to all selected cells comprising the selected block of cells. According to embodiments of the present invention, all cells in the data region 245 of a given block of cells or list 215 must be selected to apply the property to all cells in the region. Similarly, all cells in a header row 230 and all cells in a total row 240 must be selected for application of a given property to all cells in the given header row or table row. Once the desired property is selected for application to the selected block of cells, the selected property is automatically applied to all cells in the selected block of cells. Advantageously, the user is not required to apply desired properties to each individual cell of the block of cells or spreadsheet list.

According to one embodiment, the spreadsheet application 140 stores information about the identity, position and the number of rows and columns originally selected as a block group of cells or as a list. If a new row or column is added within the original group of cells or list, the spreadsheet application 140 determines that the original group of cells or list is being expanded. Likewise, if a new row is added immediately above or below the existing rows, or if a new column is added immediately adjacent to an existing column, the spreadsheet application determines that the original group of cells or list is being expanded. Additionally, if a row or column is moved from a perimeter position of the block of cells or list to an interior position between two other rows or columns, according to the present invention, the spreadsheet application determines that the associated block of cells or list is not being destroyed (only rearranged). Accordingly, properties set for a given block of cells or list may be automatically applied to new cells resulting from the addition of rows or columns, and properties set in relationship to perimeter positioned rows or columns may be reset for the columns or rows that are positioned at the perimeters of the block or list, as described below for list border behavior.

Once a property is applied to a selected block of cells or to a spreadsheet list 215, as described above, the properties applied to the block of cells or list 215 automatically grow with the block of cells or spreadsheet list. That is, if the user adds an additional column to the designated block of cells or spreadsheet list, the properties applied to the cells of the associated block of cells or list are automatically applied to the cells comprising the added column. Likewise, if the user expands the designated block of cells or list 215 by adding additional rows, the properties applied to the block of cells or list 215 are automatically applied to the added rows. According to embodiments, the spreadsheet application 140 remembers the constituency of the original or expanded block of cells or list. Properties applied to the cells comprising the original or expanded block of cells or list are remembered as being applied to the group as opposed to being applied to individual cells. Thus, through the spreadsheet application 140, each of the cells comprising the original or expanded group of cells or list has knowledge of the properties applied to neighboring cells. As should be understood, if it is desired that a property applied to a given block of cells or list 215 should not be applied to an added row or column, the property may be removed from one or more cells of the added row or column without corrupting or otherwise changing the application of the selected property to other cells comprising the block of cells or list 215.

According to an embodiment of the present invention, block properties may be set for list borders, such as the list border 220, illustrated in FIG. 2. According to prior spreadsheet applications, a list border 220 may be corrupted by the movement of a column or row sharing an edge with the list border 220. For example, referring to the list 215, illustrated in FIG. 2, according to prior spreadsheet applications, if the user column A is moved such that column A is inserted between columns B and C, the list border 220 may be corrupted because the list border 220 attempts to maintain its relationship with column A. Similarly, the list border 220 may be corrupted if a row, such as the last row 240, is moved to a different position because the list border 220 attempts to maintain its relationship with the row 240.

According to embodiments of the present invention, a block property may be set for the list border 220 so that the list border 220 is associated with the selected block of cells or list 215. Accordingly, if one or more columns or rows are moved within the block of cells or within the list 215, the list border 220 remains intact around the perimeter of the block of cells or list 215. Similarly, if new columns or rows are added, or if columns or rows are deleted from the selected block of cells or list 215, the list border 220 remains intact around the perimeter of the selected block of cells or list 215 because the block property applied to the list border 220 associates the list border 220 with the selected block of cells or list 215 as opposed to a particular column or row with which the list border shares an edge.

According to embodiments of the present invention, the list border behavior of block properties are not confined to perimeter borders like the list border 220. The list border behavior also works for border within a block of cells or list. For example, the list border behavior described herein applies to a border that separates the header row from the data region rows, or that separates the data region rows from the total row. That is, if the block properties are applied to such internal rows and a user rearranges the rows of the data region, for example, the borders will stay in place between the header row and data region rows or between the total row and the data region rows as defined by the user.

Referring still to FIG. 2, a variety of formulas may be applied to one or more cells of a spreadsheet application workbook for calculating data entered into the cell according to the applied formula. According to prior spreadsheet applications, if it is desired that a given formula be applied to all the cells of a given column or row, the desired formula must be entered or copied to each of the desired rows. According to embodiments of the present invention, an improved calculated columns property is provided. The calculated columns property is a type of block properties described above, and the calculated columns property extends the functionality of formulas to all cells in a selected column, such as a column in a list 215.

Referring to FIG. 2, for example, if column C of the list 215 represents the cost of goods sold for a business, a user may desire to enter a formula into the cells of the column to calculate quantity of items sold times item cost in order to calculate the cost of goods sold. According to the calculated columns property of the present invention, the user may enter the desired formula in a single cell of the column, and the user may selectively cause the formula to automatically fill all cells contained in the entire column. Once all cells in the selected column are filled with the desired formula, the formula will continue to propagate to all new cells added to the column of the associated list 215. For example, if the user adds additional rows to the list 215, the selected formula will automatically propagate to new cells created by the addition of the new rows across the selected column.

According to an embodiment of the present invention, if the user desires to modify the formula of a particular cell, the user may manually modify the formula of a selected cell. For example, referring to column C of the list 215 illustrated in FIG. 2, a formula of "=A2+B2" has been propagated to all cells of column C in the list 215 according to the calculated columns property of the present invention. As illustrated in FIG. 2, the user has decided to modify the cell in the third row of column C so that the formula reads "=E2+F2." According to embodiments of the present invention, a flag or icon 250 is presented to the user in the cell in which the user has modified a formula that has been propagated throughout all of the cells of the column. That is, the display of the flag or icon 250 serves as an alert to the user that the user has modified a formula that has been propagated to all cells of the associated list column.

Upon selection of the flag or icon 250, a drop-down menu or other suitable user interface may be provided to the user to allow a variety of options with respect the modified formula. For example, a first option is provided to allow the user to restore the modified formula to the pre-modified formula that is propagated to other cells in the associated list column. A second option is provided for allowing the user to selectively propagate the modified formula to all other cells contained in the associated list column. An additional option may be provided to the user to allow the user to keep the modified formula as entered without change to the formulas propagated to other cells in the associated list column, and selection of this option may, according to one embodiment, cause the flag or icon 250 to be dismissed. According to another embodiment, the flag or icon 250 remains displayed as a constant alert to the user that the formula in the associated cell has been modified relative to the formulas propagated to the other cells of the associated list column.

As described herein, block properties, including calculated columns properties, are provided for applying desired properties to selected spreadsheet cells, or to an entire spreadsheet list or spreadsheet column. Once desired properties are applied to a given group of cells or to a spreadsheet list, the properties are automatically applied to new rows, columns and associated cells added to the group of cells or spreadsheet list. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-readable medium excluding a signal, having stored thereon computer-executable instructions which when executed by a computer perform a method for applying formatting properties to a group of cells in a spreadsheet application document, the instructions comprising:

receiving a selection of a group of cells in a spreadsheet application workbook for application of a given formatting property; wherein the selection of the group of cells comprises more than one workbook row and column; wherein the selection is made using a cursor to select each of cells within the group of cells, wherein the selected group of cells becomes a block of cells such that an action that sets a property to a single cell within the block of cells is applied to each of the cells within the block of cells;

determining a position and identity the one or more workbook rows and columns making up the group of cells selected;

storing information about the identity, position and number of rows and number of columns selected for the selected group of cells;

applying the given formatting property to all of the selected group of cells;

receiving an indication to add additional cells to the spreadsheet application workbook; wherein the additional cells comprise one of: a new row of cells; a new column of cells; or a new row of cells and a new column of cells;

determining the location of the additional cells relative to an area defined by the selected group of cells; wherein the location is determined by comparing the stored information for the selected group of cells with a position of the additional cells;

determining whether the addition of the additional cells to the selected group of cells is an expansion of the selected group of cells in response to determining that the additional cells are located immediately adjacent to the selected group of cells by: determining when the additional row of cells is above the selected group of cells; determining when the additional row of cells is below the selected group of cells when the additional cells added are the new row of cells and determining when the additional column of cells is to the right of the selected group of cells and determining when the additional column of cells is to the left of the selected group of cells when the additional cells added are the new column of cells;

automatically applying the given formatting property to all of the additional cells and updating the stored information about the identity, position and number of rows and number of columns for the selected group of cells such that the selected group of cells is updated in response to determining that the addition is an expansion of the selected group of cells; and in response to receiving a modification to a spreadsheet formula in a cell that was automatically applied to the cell and other cells within the group of cells, displaying a selectable user interface element within the cell that remains displayed in the cell to indicate that the modified spreadsheet formula is also included in the other cells within the group of cells and removing the displayed selectable user interface element from the cell when the modified spreadsheet formula in the cell is changed back to the spreadsheet formula applied to the other cells.

2. The computer-readable medium of claim 1, whereby receiving the selection of a group of cells in a spreadsheet application workbook for application of a given formatting property includes receiving a selection of a group of cells comprising a spreadsheet list object.

3. The computer-readable medium of claim 1, whereby applying the given formatting property to the selected group of cells includes applying the given formatting property to each cell comprising the selected group of cells.

4. The computer-readable medium of claim 3, whereby applying the given formatting property to the selected group of cells includes applying a spreadsheet formula to each cell comprising the selected group of cells.

5. The computer-readable medium of claim 1, wherein the additional cells are non-blank cells.

6. The computer-readable medium of claim 1, further comprising:
applying a calculated columns property to each cell comprising a given column in the selected group of cells;
receiving an application of the spreadsheet formula to one cell of one or more cells comprising the given column;
automatically applying the spreadsheet formula to any other cells comprising the given column.

7. The computer-readable medium of claim 6,
whereby receiving the indication of the addition of one or more additional cells to the selected group of cells includes receiving an indication of an addition of one or more cells to the given column;
whereby determining the addition of the one or more additional cells to the selected group of cells is an expansion of the selected group of cells includes determining the addition of one or more cells to the given column is an expansion of the given column; and
whereby automatically applying the given formatting property to the one or more additional cells includes automatically applying the spreadsheet formula to the one or more additional cells of the given column.

8. The computer-readable medium of claim 1, wherein the selectable user interface element within the cell comprises a selectable option to restore the modified spreadsheet formula back to the spreadsheet formula.

9. The computer-readable medium of claim 8, whereby in response to receiving a selection of the selectable option, automatically applying the modified spreadsheet formula to all other cells of the one or more cells comprising the given column to which the spreadsheet formula is applied.

10. The computer-readable medium of claim 8, whereby in response to receiving a selection of the selectable option, automatically replacing the modified spreadsheet formula applied to the one cell with the spreadsheet formula applied to all other cells of the one or more cells comprising the given column to which the spreadsheet formula is applied.

11. The computer-readable medium of claim 1, whereby applying the given property to a given group of cells includes applying the given property to a border associated with the group of cells according to a defined orientation relative to the given group of cells, whereby movement of one of a row and column within the group of cells does not cause movement of the border from the defined orientation relative to the group of cells.

12. The computer-readable medium of claim 1, whereby applying the given property to a given group of cells includes applying an alternate row formatting property to the given group of cells such that a given formatting attribute is automatically applied to alternating rows in the given group of cells, and whereby an alternating formatting pattern created by the given formatting attribute is automatically applied to any new rows added to the given group of cells.

13. A computer-implemented method for applying formatting properties to a group of cells in a spreadsheet application document, comprising:
receiving a selection of a group of cells in a spreadsheet application workbook for application of a given formatting property; wherein the selection of the group of cells comprises more than one workbook row and column;
remembering the selection of the group of cells a block of cells such that an action that sets a property to a single cell within the block of cells is applied to each of the cells within the block of cells;
determining a position and identity of the one or more workbook rows and columns making up the group of cells;
storing information about the identity, position and number of rows and number of columns selected for the selected group of cells;
applying a calculated columns property to each cell comprising a given column in the selected group of cells;
receiving an application of a spreadsheet formula to one cell of one or more cells comprising the given column;
automatically applying the spreadsheet formula to any other cells comprising the given column;
receiving an indication of an addition of one or more cells to the given column;
determining the addition of one or more cells to the given column is an expansion of the given column in response to the location of the one or more cells relative to the given column; wherein the determination consists of determining when the location is above, determining when the location is below, determining when the location is to the left and determining when the location is to the right of the given column;
automatically applying the spreadsheet formula to each of the one or more additional cells of the given column; and
in response to receiving a modification to a spreadsheet formula in a cell that was automatically applied to the cell, displaying a selectable user interface element within the cell that remains displayed in the cell to indicate that the modified spreadsheet formula is included in one or more additional cells and removing the displayed selectable user interface element from the cell when the modified spreadsheet formula in the cell is changed back to the spreadsheet formula.

14. The method of claim 13, wherein the selectable user interface element within the cell is a flag icon that comprises a selectable option to restore the modified spreadsheet formula back to the spreadsheet formula.

15. The method of claim 14, whereby in response to receiving a selection of the selectable option, automatically applying the modified spreadsheet formula to all other cells of the one or more cells comprising the given column to which the spreadsheet formula is applied.

16. The method of claim 15, whereby in response to receiving a selection of the selectable option, automatically replacing the modified spreadsheet formula applied to the one cell with the spreadsheet formula applied to all other cells of the one or more cells comprising the given column to which the spreadsheet formula is applied.

17. The method of claim 13, whereby receiving a selection of a group of cells in a spreadsheet application workbook for application of a given formatting property includes receiving a selection of a group of cells comprising a spreadsheet list object.

18. A computer-readable medium excluding a signal, having stored thereon computer-executable instructions which when executed by a computer perform a method for applying formatting properties to a group of cells in a spreadsheet application document, the instructions comprising:

receiving a selection of a group of cells in a spreadsheet application workbook for application of a given formatting property;

determining a position and identity of one or more workbook rows and columns making up the group of cells;

storing information about the identity, position and number of rows and number of columns selected for the selected group of cells;

remembering the selection of the group of cells a block of cells such that an action that sets a property to a single cell within the block of cells is applied to each of the cells within the block of cells;

applying a calculated columns property and the given formatting property to each of the cells comprising a given column in the selected group of cells;

receiving an application of a spreadsheet formula to one cell of one or more cells comprising the given column;

automatically applying the spreadsheet formula and the given formatting property to each of the other cells comprising the given column;

in response to receiving an indication of an addition of one or more cells to the given column, immediately determining that the addition of one or more cells to the given column is an expansion of the given column in response to a determination of the location of the one or more cells relative to a boundary defined by the area the given column occupies; wherein the determination of the location comprises accessing the stored information about the selected group of cells;

automatically applying the spreadsheet formula and the given formatting property to the each of the additional cells of the given column and updating the stored information about the selected group of cells to indicate a new size for the selected group of cells and in response to receiving a modification to a spreadsheet formula in a cell that was automatically applied to the cell, displaying a selectable user interface element within the cell that remains displayed in the cell to indicate that the modified spreadsheet formula is included in each of additional cells and removing the displayed selectable user interface element from the cell when the modified spreadsheet formula in the cell is changed back to the spreadsheet formula.

\* \* \* \* \*